March 3, 1964     S. N. LEVINE ETAL     3,122,843
ELECTRICAL QUESTION AND ANSWER MATCHING DEVICE
Filed April 7, 1961     2 Sheets-Sheet 1
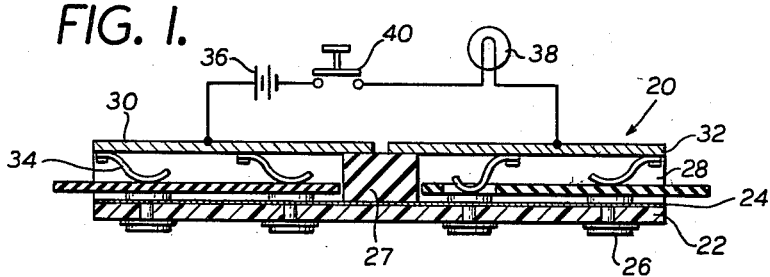
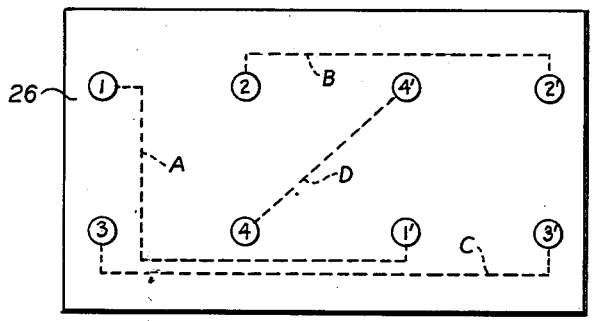
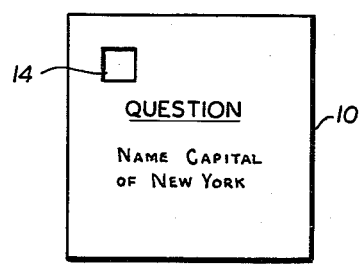
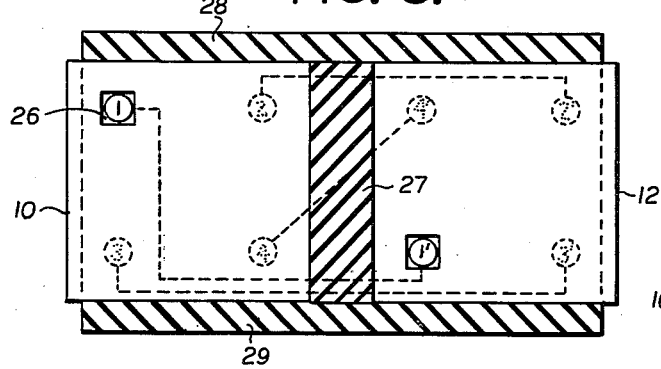
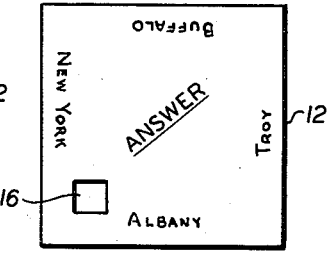
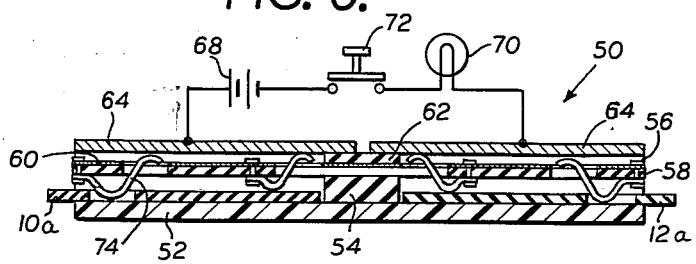
INVENTORS
SUMNER N. LEVINE
BY CAROLINE G. LEVINE
ATTORNEY.

March 3, 1964 S. N. LEVINE ETAL 3,122,843
ELECTRICAL QUESTION AND ANSWER MATCHING DEVICE
Filed April 7, 1961 2 Sheets-Sheet 2

INVENTOR
SUMNER N. LEVINE
CAROLINE G. LEVINE
BY
ATTORNEY.

3,122,843
ELECTRICAL QUESTION AND ANSWER MATCHING DEVICE

Sumner N. Levine and Caroline G. Levine, both of 225 Eastern Parkway, Brooklyn, N.Y.
Filed Apr. 7, 1961, Ser. No. 101,528
2 Claims. (Cl. 35—9)

This invention relates to a question and answer device or game for educational, entertainment and other purposes.

The principal object of this invention is the provision of a card actuated question and answer matching device employing coded punched cards as the carriers of the question asked while the answers sought may be entered either by coded punched cards or, in another modification, by labelled manually operated switches.

Briefly stated, the invention comprises a plurality of incomplete circuits, preferably of a printed variety, two groups of switching elements connected to said circuit, a group of question cards and, in one modification, a second group of answer cards. The question cards are adapted to actuate one group of switching elements while the second group of switching elements may be actuated manually or by an answer card. If the cards are properly matched or if the proper set of manually operated switches are closed the circuit will be completed. If this is not the case, then the circuit will not be completed in its entirety. An audible or visual signal may be incorporated into the device to indicate the correct choice of the answer.

This device has many uses in the educational field. For example, it may be used to teach virtually every conceivable subject, such as history, geography, mathematics, foreign language and music. The device may also be used for purposes of entertainment, and many kinds of matching games may be played with it. In some cases the educational and entertainment aspects of the invention may be combined, as for example in word and symbol association and art appreciation.

The invention is illustrated in four forms, but it will be understood that this is not intended by way of limitation but rather to suggest the various possibilities of which the invention is susceptible. In its broadest aspects it comprises a number of printed or equivalent circuits, a plurality of normally open switches, or a plurality of normally closed switches, or a combination of normally open and closed switches, and one or more groups of punched coded cards. In the case of normally open switches, the imperforate portions of the cards would engage and close such switches. Those switches which would register with the punched portions of the cards would remain open. Conversely, the imperforate portions of the cards would open normally closed switches, and those switches which register with the punched holes would remain closed. Within these boundaries many variations and modifications of the invention may be devised. For example, the circuits may be made relatively simple, with only two switch elements in each circuit, one actuated by a question card and the other by an answer card. On the other hand, there may be employed a rather complex circuit consisting of an assembly of switches on the question side connected in a series-parallel arrangement with a corresponding assembly of switches on the answer side. Each question and answer card will then be provided with a number of holes so arranged that on correctly matching the two cards one of the multiplicity of possible circuits will be completed in series. The various combinations of holes provide, in this realization, a coding system of considerable flexibility and variety. Still further variations employ only one set of switch actuating coded cards for the question portion of the device while the answer may be registered manually by closing or opening labelled switches at the answer portion of the device.

Other variations will suggest themselves as the specification proceeds. By way of illustration, the coded cards may be made of any suitable sheet material and in any desirable size and shape. Relatively heavy paper, commonly used for card and tag purposes, and relatively thin sheet plastics may be used and die cut or punched in connection with the present invention. In one form of the invention, the cards may be cut square, so as to permit of insertion into the device in any one of four different positions. This would lend itself to a question and answer situation of the multiple choice variety. A circular or disc-shaped card could be used to equal and perhaps even greater advantage, since a great number of possible answers may be inscribed upon a single disc and a corresponding number of angular positions of said disc may be had. By the same token, it will be understood that the invention need not require actuating cards in the strict sense of the word. A continuous tape, punched and coded, would serve to equal advantage. An endless belt, also punched and coded, would similarly satisfy the requirement of the invention. However, for the purposes of clarity and simplicity, the term "punched coded card" as herein used is intended to include all varieties and variations of punched coded elements. Similarly, the term "printed circuit" as herein used is intended to encompass conventional printed circuitry, as well as all equivalents such as wire and solder circuits, etched circuits, and the like.

The invention is illustrated in the accompanying drawing, in which:

FIG. 1 is a vertical section through a question and answer matching device of the character herein claimed, showing the use of a plurality of normally closed switches engaged by a pair of punched, coded question and answer cards.

FIG. 2 is a circuit diagram of a simple type of printed circuit of said device.

FIG. 3 is a horizontal section showing the question and answer cards applied to said circuit diagram.

FIG. 4 is a plan view of a simple type of question card.

FIG. 5 is a plan view of a multiple choice answer card for use in association with the question card of FIG. 4.

FIG. 6 is a sectional view similar to that of FIG. 1, but showing the use of normally open switches.

Figure 7:
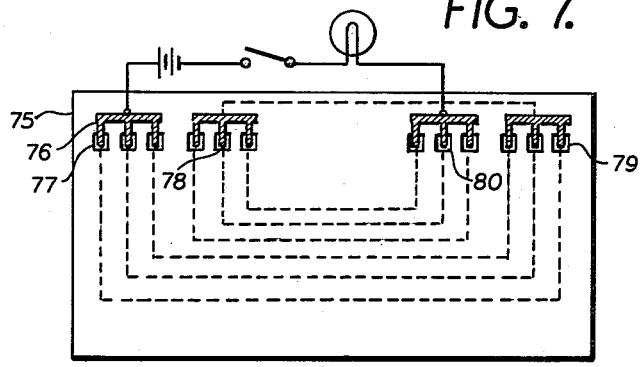
FIG. 7 is a circuit diagram of a series parallel type of arrangement showing the interconnections between the normally closed switching arrays.

Referring now to FIGS. 4 and 5 of the drawing, it will be understood that question and answer cards 10 and 12 are square in plan view and are provided with square punched holes 14 and 16, respectively. Just as the square shape of these cards is illustrative, so is the square shape of their punched holes, and each is provided with only one such hole, to reduce the invention to its simplest and most elementary proportions. It will be noted that inscribed on card 10 are the words "Question. Name Capital of New York." Inscribed on card 12 are the words "Answer" and "Albany," "Troy," "Buffalo" and "New York." It will be noted that card 12 is arranged for a multiple choice type of quiz.

Referring now to FIGS. 1, 2 and 3, it will be noted that the present device 20 comprises essentially a dielectric base plate 22 having a plurality of printed circuits 24 formed thereon, a plurality of electrical contact members 26 secured to said base plate 22 and connected to said printed circuits, an intermediate block 27, and a pair of side wall 28 and 29, respectively, mounted on said base plate, a pair of plate conductors 30 and 32 mounted on said block and side walls, a plurality of resilient contact members or switch elements 34 secured to said plate conductors, a voltage source 36, a lamp 38 and a push button switch 40. Contact or switch elements 34 are spring-biased into engagement with contact elements 26 to form normally closed switches.

The several contact elements 26 are numbered 1, 2, 3 and 4 to form the question group and 1', 2', 3' and 4' to form the answer group. Printed conductor A connects contacts 1 and 1', printed conductor B connects contacts 2 and 2', printed conductor C connects contacts 3 and 3', printed conductor D connects contacts 4 and 4'.

In the use of this device, a question card 10 is inserted between contact elements 1, 2, 3 and 4, on the one hand, and the corresponding spring-biased contact members 34, on the other hand. Similarly, an answer card 12 is inserted between contact elements 1', 2', 3' and 4', on the one hand, and the corresponding spring-biased contact members 34 on the other hand. Block 28 may serve as a barrier or partition between the two cards and as a depth gauge to assist in properly positioning the cards. Side walls 28 and 29 also serve as guide members for precise positioning of the cards.

Punched hole 14 in card 10 will register with and expose contact element 1. On the assumption that card 12 is properly oriented, punched hole 16 will register with and expose contact element 1'. The spring-biased contact members 34 which register with contact elements 1 and 1' will engage said elements through holes 14 and 16. All of the other spring-biased contact members 34 will be prevented from engaging their respective contact elements 2, 3, 4 and 2', 3', 4', by reason of the interposition of cards 10 and 12.

There will now be completed a circuit comprising the following components: voltage source 36 (such as a dry cell battery), conductor plate 30, one of the spring biased contact members 34, contact element 1, conductor A, contact element 1', a second spring-biased contact member 34, conductor plate 32, electric light bulb 38 and push button switch 40. This is a normally open switch which may be closed manually in order to test the circuit. If the right answer card is inserted into the device, and if it is properly oriented, a closed circuit will result when push button switch 40 is actuated, and this will be made known by the lighting of bulb 38. It would of course be a rule of procedure to read that name or answer on card 12 which appears upright. In the case illustrated, this would mean that "Albany" is the proper answer to the question on card 10. If answer card 12 had been inserted into the device in any other position than that shown in the drawing, punched hole 16 would not have registered with contact element 1'. This would have prevented the completion of any circuit in the circuit diagram.

FIG. 6 represents a variation of the showing of FIG. 1. It discloses a device 50 comprising a base plate 52, on which the two cards 10a and 12a are placed. Intermediate block 54 and side walls 56 support plate 58, on which a printed circuit 60 is formed. An additional block 62 and said side walls 58 support a pair of conductor plates 64 and 66, respectively. A voltage source 68, a bulb 70 and a push button switch 72 are connected across said conductor plates 64 and 66. Spring-biased contact members 74 are secured to plate 58, and they are, of course, individually connected to the several printed circuits on said plate. It will be seen that these contact members are biased in downward direction, as viewed in FIG. 6, and consequently they would not normally engage either of the conductor plates 64 and 66. However, when cards 10a and 12a are inserted into the device, their imperforate portions will engage some of the spring-biased contact members 34 and press them into engagement with the conductor plates 64 and 66. In short, spring-biased members 74 are normally open switch elements, subject to being closed, that is, brought into engagement with the conductor plates, by means of cards 10a and 12a. By way of illustration, each of these cards would be provided with three punched holes, instead of only one as is the case with cards 10 and 12 in FIGS. 4 and 5. Assuming that there are as many spring-biased contact or switch elements 74 as there are elements 34, it will be apparent that the three holes in each of the two cards 10a and 12a will register with a total of six elements 74, permitting them to remain in open position. Only the remaining two elements 74, which engage imperforate portions of the cards, will be thrust into closed positions in engagement with conductor plates 64 and 66. In all other respects, however, the operation of device 50 corresponds with device 20 hereinabove described.

Referring to FIG. 7 there is shown a further modification of this invention employing a simple series-parallel type of switching arrangement, a non conducting board 75 is shown bearing electrical contacts 77 interconnected by printed circuits in a series-parallel arrangement as shown. There are also shown four sets of metal contact elements 76, each bearing three spring contacts so arranged as to press down on the fixed contacts 77 and forming thereby a normally closed set of switches. Said metal contact elements 76 may be mounted directly to the board 75 or affixed to a second support immediately above the electrical contacts 77. The two elements on the left hand portion of the board are associated with the question bearing card while those on the right with the answer bearing card.

Figure 8:
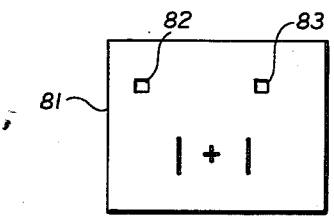
FIG. 8 is a plan view of a question card applied to the circuit shown in FIG. 7.
Figure 9:
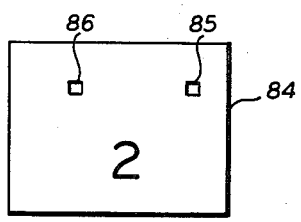
FIG. 9 is a plan view of a corresponding answer card applied to the circuit shown in FIG. 7.
Figure 10:
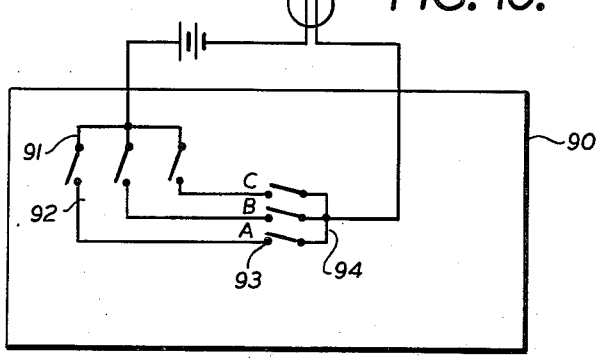
FIG. 10 is a circuit diagram of a device employing manually operated answer switches.
Figure 11:
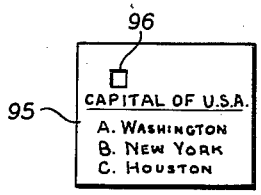
FIG. 11 is a plan view of a hole coded question card applied to circuit indicated in FIGURE 10.

A question bearing card 81 suitable for this modification is shown in FIG. 8 and bears two perforations 82 and 83 permitting, when inserted into the left hand portion of the device, only one spring at each of the two groups of contacts on the question side, 77 and 78, to remain closed in the manner explained earlier. Similarly, an answer bearing element 84 shown in FIG. 9 is provided also containing two perforations 85 and 86 while an insertion into the right hand portion of 75 permits only contacts 79 and 80 to remain closed and so completing the series circuit. It is obvious that this principle can be extended so as to include a greater number both of contact elements 76 and associated springs thereby increasing the capacity of the device. Moreover, a normally open switching system may also be employed in a manner illustrated previously. Various further modifications of this invention may be devised in which the question bearing card is entered into a normally closed set of switches while the answer is entered manually by means of a normally open set of switches. The circuit diagram of a modification of the present invention which provides for manually selected answers of the multiple choice type is shown in FIG. 10. This modification consists of a non conducting base 90 to which are affixed contacts 92 in registration with the aforesaid spring contact elements 91 so as to provide a normally closed circuit. Said fixed contacts are connected, as shown, to a manually operated switch 93 such as a set of push buttons or the terminals of a selector switch, said manually operated switches being labelled to correspond with the multiple choices presented on a hole coded card 95 of the kind shown in FIG. 11. The hole permits contact to be maintained between terminals 91 and 92, as described previously, when the card is brought into registration with the circuit shown in FIG. 10 while the remaining contacts will be forced open by the imperforate portions of the card. Hence the circuit will be completed only on manually closing terminals 93 and 94 which are labelled to correspond with the correct answers.

As has already been indicated, only simplified forms of the present invention are herein illustrated, and it will be clearly understood that these forms may be modified and other forms may be provided, within the broad principles of the invention and the scope of the claim.

What is claimed is:

1. A question and answer matching device of the character described, comprising a base plate, a plurality of printed circuits formed on said base plate, fixed contact elements connected to said base plate and printed circuits, a pair of conductor plates mounted in co-planar relation above said base plate, a plurality of spring contact elements connected to said conductor plates in registration with said fixed contact elements, a punched, coded question card adapted to be inserted between the spring contact elements of one of said conductor plates and the corresponding fixed contact elements on the base plate, a punched, coded answer card adapted to be inserted between the spring contact element of the second conductor plate and the fixed contact elements of the base plate in registration therewith, a source of electric current, an electrical signaling device and a manually operated switch connected in series across said conductor plates, said spring contact elements being normally biased into engagement with the fixed contact elements and comprising normally closed switches, the imperforate portions of said cards being adapted to disengage said spring contact elements from said fixed contact elements, thereby opening said switches, only those spring contact elements which register with the punched holes in said cards remaining in engagement with their corresponding fixed contact elements, said answer cards being square-shaped so that they may be inserted into said question and answer matching device in any one of four different positions, the holes being so located in said cards that only when the cards are properly oriented do said holes register with those switch elements which will yield a correct answer.

2. A question and answer matching device of the character described, comprising a base plate, a pair of conductor plates disposed in co-planar relation above the base plate in spaced relation thereto, an intermediate plate supported between said base plate and said conductor plates, a plurality of printed circuits formed on said intermediate plate, a plurality of openings formed in said intermediate plate, a plurality of spring contact elements connected to said intermediae plate and said printed circuits, and having portions which project downwardly in the direction of the base plate and other portions which project upwardly through said openings in the direction of the conductor plates, a source of electric current, an electrical signalling device, and a manually operated switch connected in series across said conductor plates, and a pair of punched, coded cards adapted to be inserted between said spring contact elements and said base plate, one of said cards being a question card and the other an answer card, the imperforate portions of said cards being adapted to engage the downwardly projecting portions of said spring contact elements and thereby to thrust their upper portions into engagement with said conductor plates, only those spring contact elements whose downwardly extending portions register with the punched holes in said cards remaining out of engagement with said conductor plates, said answer cards being square-shaped so that they may be inserted into said question and answer matching device in any one of four different positions, the holes being so located in said cards that only when the cards are properly oriented do said holes register with those switch elements which will yield a correct answer.

References Cited in the file of this patent
UNITED STATES PATENTS

| | | |
|---|---|---|
| 2,586,234 | Kopas | Feb. 19, 1952 |
| 2,720,038 | Clark | Oct. 11, 1955 |
| 2,872,741 | Krueger et al. | Feb. 10, 1959 |
| 2,943,399 | Davis | July 5, 1960 |
| 3,050,871 | Jacobs | Aug. 28, 1962 |